United States Patent [19]

Santicchi

[11] Patent Number: 5,076,417
[45] Date of Patent: Dec. 31, 1991

[54] AUTOMATIC MACHINE FOR LIFTING, TRANSFERRING AND UNLOADING CLOTHES-HANGERS BETWEEN TWO ADJACENT OVERHEAD CONVEYOR LINES

[76] Inventor: Augusto Santicchi, 06100-Perugia Fraz., San Sisto, Strada San Andrea delle Fratte, Italy

[21] Appl. No.: 583,232

[22] Filed: Sep. 14, 1990

[30] Foreign Application Priority Data

Oct. 13, 1989 [IT] Italy ................................. 645 A/89

[51] Int. Cl.⁵ ............................................. B65G 37/00
[52] U.S. Cl. ............................... 198/465.4; 198/468.2; 198/468.6; 198/680
[58] Field of Search ............... 198/465.4, 468.2, 468.6, 198/680

[56] References Cited

U.S. PATENT DOCUMENTS

| | | | |
|---|---|---|---|
| 4,739,874 | 4/1988 | Akutagawa et al. | 198/468.6 X |
| 4,946,023 | 8/1990 | Heinold et al. | 198/465.4 X |
| 5,012,918 | 5/1991 | Acker et al. | 198/465.4 |

Primary Examiner—Joseph E. Valenza
Assistant Examiner—Tuan N. Nguyen
Attorney, Agent, or Firm—Leonard Bloom

[57] ABSTRACT

This invention relates to an automatic machine for lifting, transferring and unloading clothes-hangers between two adjacent overhead conveyor lines, operating in both directions and fitted with a device for opening out the clothes on one of the conveyor lines so as to facilitate unloading the incoming clothing items between the lines. The machine according to the invention consists of a trolley sliding on horizontal runners. A clip may be fitted to the trolley for grasping the hanger hook. This clip translates vertically - for unloading and loading - or rotates up to 180° around a vertical axis up - for tipping over the hanger hook before it is unloaded.

5 Claims, 5 Drawing Sheets

AUTOMATIC MACHINE FOR LIFTING, TRANSFERRING AND UNLOADING CLOTHES-HANGERS BETWEEN TWO ADJACENT OVERHEAD CONVEYOR LINES

This design patent relates to an automatic machine for lifting, transferring and unloading clothes-hangers between two adjacent overhead conveyor lines.

The machine according to the invention is designed to automatize and consequently reduce the number of operations required to transfer hangers with the clothing item between the overhead conveyor lines used in clothing manufacturing factories, warehouses or cloakrooms or in all those cases when it is necessary to move large numbers of clothing on their hangers quickly.

The applicant of this design patent has already designed and patented an automatic device which carries out the above operations, even if only in one direction; in other words said device lifts a hanger from the conveyor line, rotates, transfers and unloads it to a second conveyor line, although the device can not repeat this operating cycle in reverse direction from the second conveyor line. The rotation of the hanger while the same is transferred consists of turning over 180° so that the hook moves into the necessary position, namely with its hollow and open side facing the new conveyor line—so that it can be hung into the supports fitted on the conveyor line.

Even though this device is extremely practical and reliable, the operating space between the two adjacent conveyor lines must be much wider than the width of the hanger transferred since the hook rotates with the hanger so that the space between the lines must be wide enough to allow the hanger and the clothing item on the same to rotate freely, above all because the clothing item tends to oscillate and wave about while the hanger rotates.

Therefore to prevent the clothing item which is being transferred from interfering with the rows of clothing items hanging on the two conveyor lines, the space between the lines must be fairly wide.

On the basis of these observations, the machine according to this design patent application was designed not only to perfect the general technology in this sector but above all to make it possible to move clothing items from one overhead conveyor to another in both directions and to reduce the space required between the two conveyor lines. The latter is now possible thanks to the fact that the machine according to the invention rotates only the hook of the hanger without rotating the same so that the clothing item on the hanger no longer moves or waves about.

It is evident that thanks to this feature the space required between the adjacent conveyor lines can now be reduced to the width of a standard sized hanger.

The machine according to the invention consists fundamentally of a trolley sliding along two horizontal support and runner bars placed transversely above two overhead lines between which the clothing items are to be transported.

A vertical clip-holder bar projects from under this trolley. Said bar is supported by a vertical supporting shaft which can be translated vertically or rotates 180° around its longitudinal axis by means of pneumatic starting devices.

At the bottom of the trolley, on the sides of the above clip-holder bar, there are two vertical arms splined to the two opposing ends of a horizontal shaft fitted idle in a transverse hole made specifically for this purpose on a bottom section of the above trolley; externally and at their bottom ends, these arms support the same number of pneumatic cylinders having a horizontal axis on whose shaft two opposing disks are fitted which grasp the neck of the hanger when the hook rotates.

In order to facilitate unloading the hangers on a conveyor line, the system has an opening device which spaces two adjacent hangers so that the clothing item being transferred can be easily inserted between the same. With just a few modifications, the machine could even be adapted to handle single-block hangers whose hook can not be rotated with respect to the actual hanger; in this case the entire hanger would have to be rotated during transfer according to the operating method of the device previously patented by the METALPROGETTI Company.

In order to obtain this result, a special vertical clip-holder bar is fitted to the trolley of the machine according to the invention; in this case the bar is fitted with a horizontal fork which can grasp the neck of the hanger from opposite sides so that the hanger is rotated together with the clip-holder bar; the purpose of this fork is to prevent the clothing item from waving about too much when the hanger turns.

For major clarity the description of the invention continues with reference to the enclosed drawings which are intended for illustrative purposes and not in a limiting sense, whereby.

With reference to the above figures the preferred embodiment of the machine according to the invention is fitted with a supporting frame consisting of a horizontal frame (1) supported by uprights positioned transversely and above the two conveyor lines.

The horizontal frame (1) has two circular parallel bars fitted side by side which act as support and runner for a trolley (2) which translates in alternative directions by means of a pneumatic cylinder (3) and thereby moves into its operating position above one of the two overhead conveyor lines.

A plate (4) is fitted so as to overhang above the trolley (2) for installing all the command and control devices required for operating the trolley; in particular, a block (5) projects vertically towards the front end of this plate (4); this block has a vertical groove (5a) at the front in which a tooth fitted at the back of small support platform (6) for a pneumatic device (7), fits and slides; this standard support platform (6) is interlocked to a vertical shaft (8) which crosses the trolley (2) to come out at the bottom thereby supporting the vertical clip-holder bar (9). In particular, the platform (6) is fixed at the top of the shaft (10a) of a pneumatic cylinder having a vertical axis (10) fixed at the bottom to the plate (4), whose operation forces the platform (6) to perform alternative runs together with the shaft (8) and the underlying clip-holder bar (9).

In this regard attention is drawn to the cylindrical helicoidal spring (8a) fitted along the shaft (8) which forces the return of the latter in lifted position at rest even if the pneumatic cylinder (10) does not return. It should also be noted that the shaft (8) can perform alternate rotations of up to 180° around its axis by the action of the above pneumatic device (7) thereby rotating the clip (11) fitted at the bottom end of the vertical bar (9) at the same time and consequently also the hook of the hanger supported by the same.

The trolley (2) is fitted with a prismatic section (2a) having a circular through hole into which a shaft (12) is fitted and rotates idly; at the ends of the shaft (12) two identical vertical arms (13) are splined, the same being opposing and symmetrical with respect to the clip-holder bar (9); at the bottom ends of each of these arms (13) there is a pneumatic cylinder (14) whose shaft crosses the end of the respective arm (13) and comes out inside so as to support a disk (14a).

As mentioned, the purpose of these two opposing disks (14a) is to grasp the opposite ends of the hanger when the hook is rotated by the clip-holder bar (9).

In this regard it should be noted that the two vertical arms (13) are kept at rest in a sub-vertical position by a special shock absorbing device (15)—fixed to a support bracket (15a) screwed to the section (2a) of the trolley (2)—which keeps these arms (13) in a slanted position so that the sliding axis of the opposing disks (14a) is on the same vertical plane as the resting point of the hanger hook inside the clip (9); this is in fact necessary for the hanger to be grasped exactly in the correct position, namely at the center of its neck just under the hook.

A horizontal bar (16) is fixed externally to one of the two vertical arms (13); two idle running rollers (16a) are supported at the ends of the horizontal bar (16) which operate with the cams (17) fitted on the frame of the two conveyor lines, so as to stop and tip the pair of arms (13) backwards when the trolley (2) is at the end of its run thereby enabling the clip (11) to load or unload the hanger.

The clip (11) which is mounted at the base of the bar (9) consists of two sections, one of which is fixed (11a) and the other which opens (11b) and which is pivoted to the first (11a) section and subjected constantly to the drive of a spring which ensures the secure closing of the clip (11) when the same is at rest; on the side of the opening section (11b) there is a horizontal projecting part (11c) on which to intervene to open the clip (11).

Figure 6:
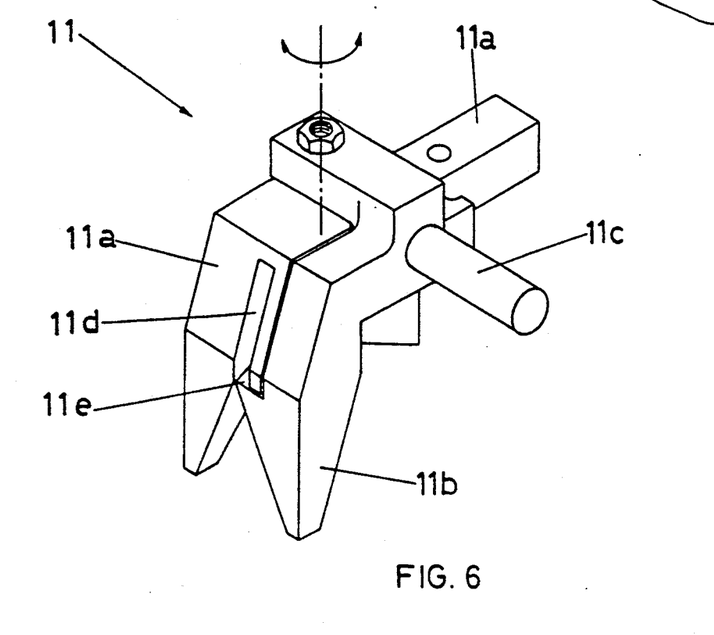
FIG. 6 is an axonometric illustration of the clip fitted to the clip-holder arm of the machine according to the invention.

With reference to FIG. 6, it can in particular be noted how the sections of the clip (11) end at the front with two prismatic sections turned downwards and chamfered internally which together form an upside down "V" whose tip is positioned at the entrance of a vertical opening (11d)—on the fixed section (11a) and delimited by a two parallel side walls and by a curved back wall—so as to perfectly house the hanger hook which is lifted.

It is inside this very opening (11d) that the hanger hook fixes when the clip (11) locks, thanks also to the intervention of a slanted step (11e) which projects from the side of the prismatic section of the mobile section (11b) and whose purpose is to close the opening (11d) from the bottom so as to prevent the hanger hook from sliding out; when the clip opens, the sections open out thereby releasing this step (11e) from the opening (11d) from which the hanger hook—which is now totally free—falls by the force of gravity down and hooks on the specially fitted supports on the conveyor line.

Close to the loading-unloading areas on each of the two conveyor lines, there is a rod with a vertical axis (18) whose purpose is to interfere with the above projecting part (11c) of the clip (11) so as to open the same; this rod (18) returns upwards—overcoming the opposing force of a spring which keeps it in an external position—within its own housing and disappears when its intervention with the clip (11) is not suitable for that particular phase of operation.

An opening device is also fitted close to the loading-unloading point of each conveyor line which widens the clothing items which are hung on the line so as to facilitate inserting a clothing item which is being unloaded between the same.

This device is positioned externally on both conveyor lines, namely on the opposite side of the lifting, transferring and unloading trolley; it consists of a horizontal pair of shaped paddles (19) which at rest terminate edgewise against each other inside an orthogonal vertical plane in the running direction of the conveyor line and consequently parallel to the hangers to be opened. Said paddles (19) have an end section (19a) at which they are screwed to the foot of two rocking levers (20) each of which ends at the top with a collar (20a) which is fitted and slides along one of the two parallel horizontal runner bars (21), fitted with circular section, and which are fixed so that they overhang a sliding block (22) which—thanks to a respective pneumatic cylinder with a vertical axis (22a)—can perform alternating vertical runs along other vertical runner bars (23) which also have a circular section and are fixed to a "C" shaped support (24) which is in turn fixed to the support frame (1) of the machine.

At the external end of the pair of horizontal runner and support bars (21), there is a connection plate (25) externally and at the center of which a pneumatic cylinder (26) is fitted, whose shaft crosses this plate (25) and then hooks to a transverse bracket (27) which fixes the collars (20a) of the above rocking levers (20) together.

It is obvious that the alternating horizontal runs of the shaft of the pneumatic cylinder (26) cause the pair of rocking levers (20) and consequently also the opening paddles (19) fitted to the same, to perform simultaneous runs in the same direction.

These paddles (19) are opened by two different coaxial pneumatic cylinders (28) and (29)—having connecting shafts—which are installed transversely on the two rocking levers (20); each cylinder opens the paddles (19) according to its own opening angle, in that cylinder (28) opens the paddles (19) to a maximum and closes them while cylinder (29) functions only when the paddles (19) need to be closed only partially and therefore in a partially opened position.

Figures 1, 2:
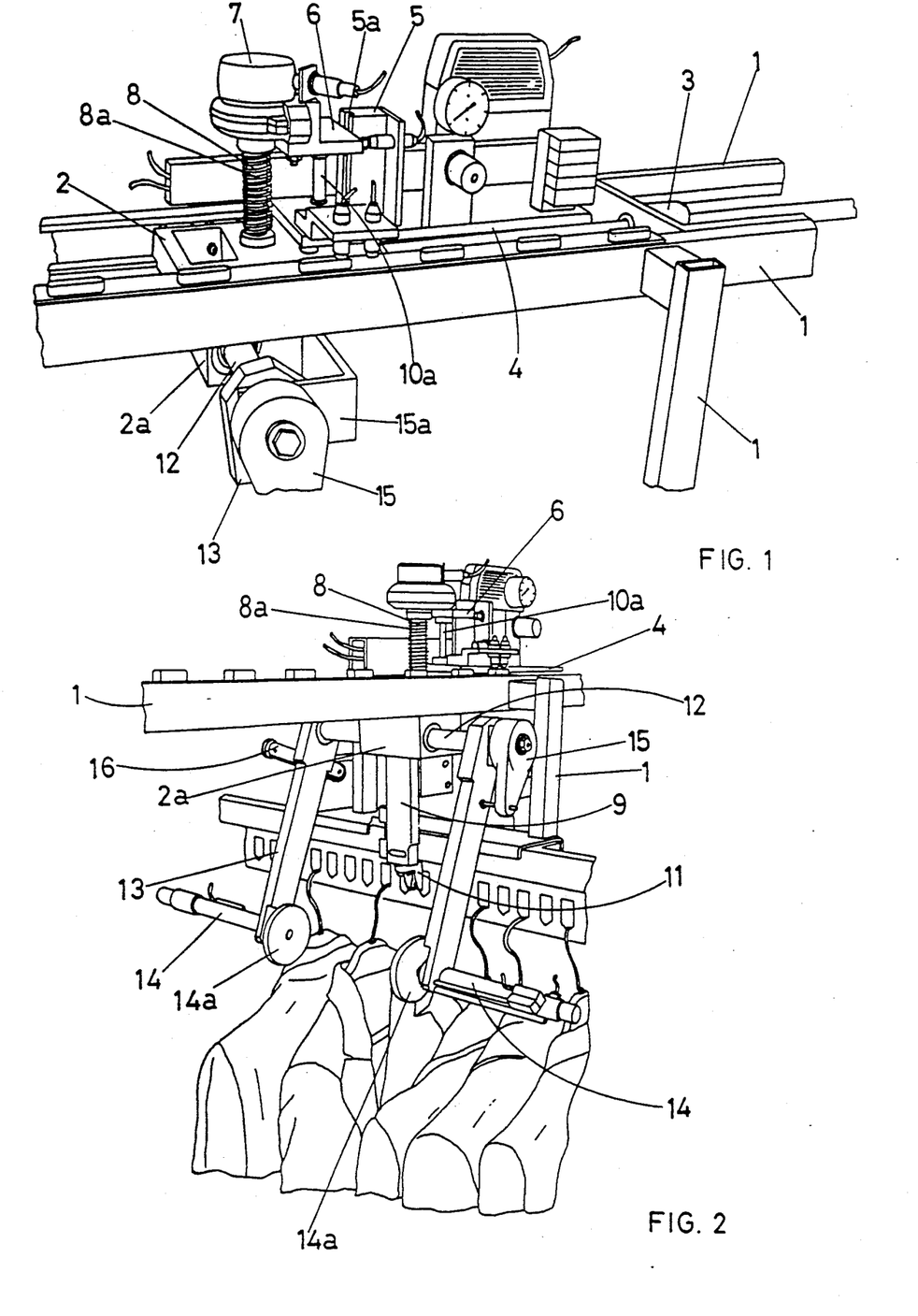
FIG. 1 is a top view of the above trolley of the machine according to the invention.
FIG. 2 is a bottom view illustrating the parts fitted at the bottom of the trolley.
Figure 3:
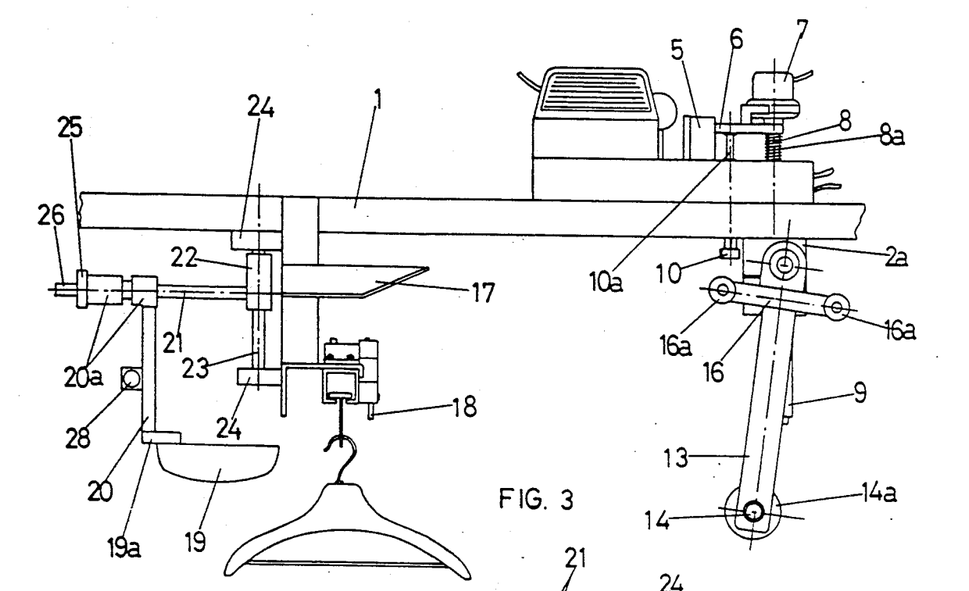
FIG. 3 is a schematic side view of the machine which illustrates the opening device and the lifting and transferring device.
Figure 4:
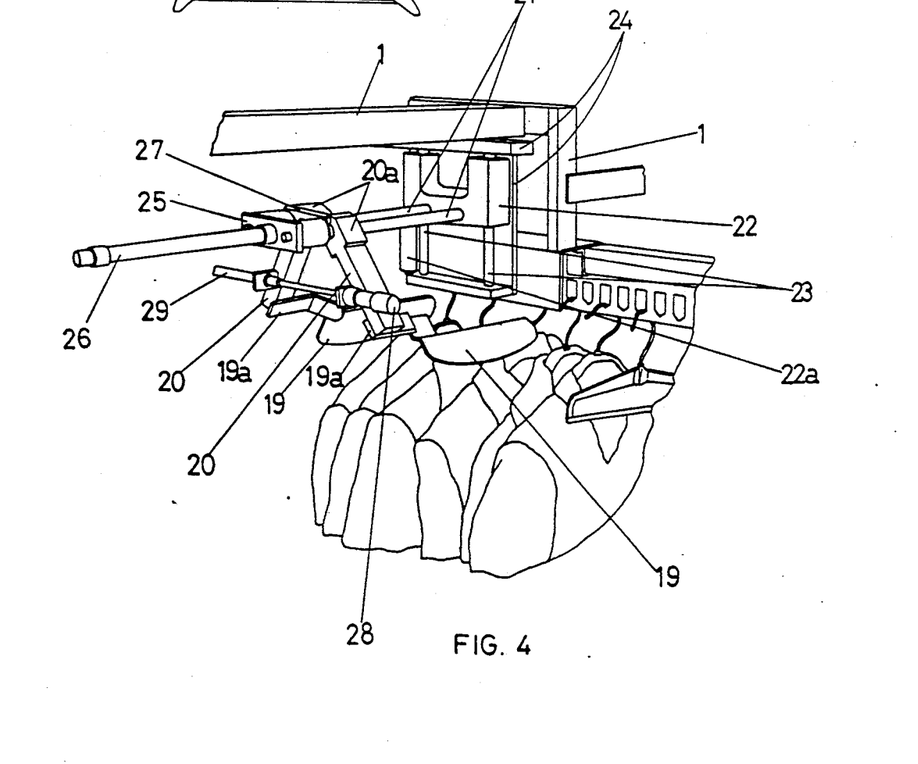
FIG. 4 is a back view of the opening device.
Figure 5:
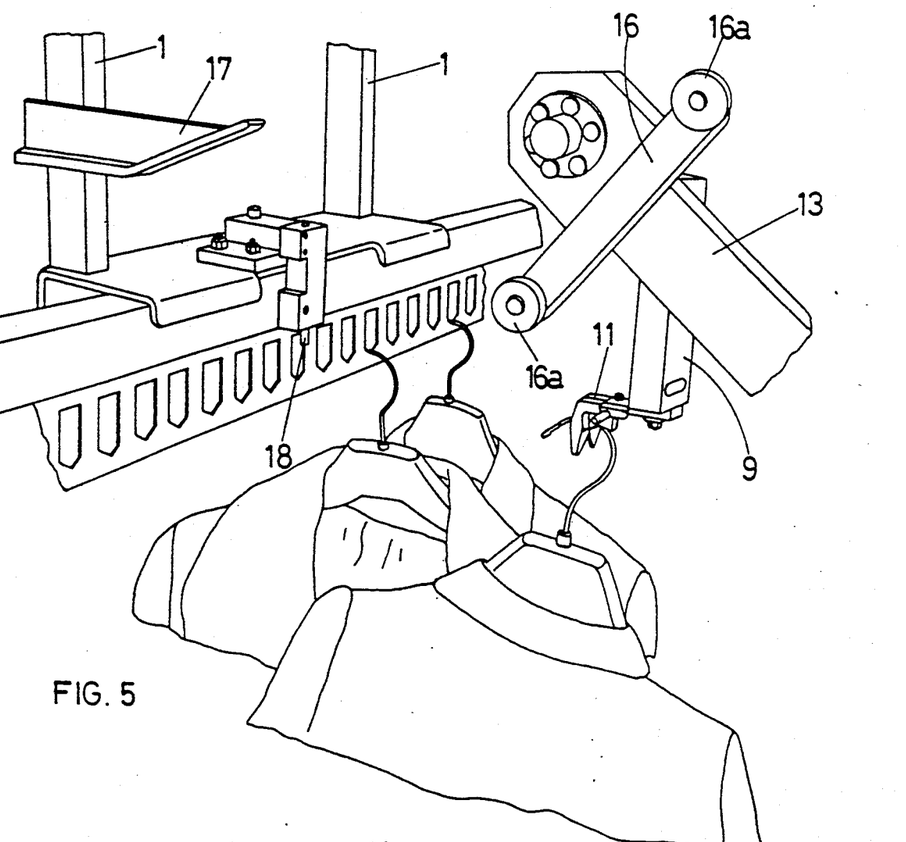
FIG. 5 is a view of the unloading-loading station along one of the overhead conveyor lines.

In particular the opening device has two semicircular geared sectors which are engaged—not shown on FIG. 4—and respectively fixed on the front of the rocking lever (20) so as to ensure the simultaneous and identical rotation in the opposite direction of the rocking levers and consequently also of the paddles supported by the same (19) each time the pneumatic cylinders (28) and (29) operate.

Having completed the description of the different components of the preferred embodiment of the machine according to the invention, the operating cycle will now be described, presuming that this cycle starts with the clip (11) at rest and at the same distance between the two adjacent conveyor lines.

Once the machine has received the command to lift a hanger from one of the conveyor lines, the cylinder having a horizontal axis (3) drives the trolley (2) to the end of the run, into a position whereby the clip (11) stops above the hook of the hanger to be lifted; in this case, the clip is open as a result of the opposition between the vertical rod (18)—on the conveyor line—and the horizontal projecting part (11c) on the opening section (11b) of the clip (11).

At the same time, the arms (13) are stopped and tipped backwards—so as to avoid interfering with the loading of the hanger by the clip (11)—by the action of the rod (16) against the cam (17).

The subsequent movement of the machine is due to the intervention of the cylinder (10) which lowers the shaft (8) and clip-holder bar (9) unit, so that the clip can grasp the hook below.

Regarding the opening of the clip (11), it should be mentioned that this first opens, as indicated, towards the end of the run; then, while it descends, it first closes spontaneously in that the same has lost the striker of the rod (18), but then it reopens automatically as a result of the interference with the hanger hook, which, by making use of the V shaped profile of the clip (11) sections, causes the same to open; the return spring fitted between the sections of the clip (11) snaps the clip close immediately afterwards so as to secure the hook which is now housed between the two sections.

Once the hanger has been hooked, the same cylinder having a vertical axis (10) makes the clip (11) return, and during this vertical translation of the clip (11) there is no interference by the overlying rod (18) in that the same under the thrust of the horizontal ascent of the clip (11c) returns into its housing and then comes out again immediately after thanks to the thrust of the spring coupled to the same, as soon as the clip starts its horizontal run towards the other conveyor line. This horizontal run is caused by the cylinder having a horizontal axis (3) fitted, as previously mentioned, to the trolley (2) which supports the clip (11) and all the other components mentioned.

During this horizontal transfer run, as soon as the rod (16) has been released from the contact with its respective cam (17), pneumatic cylinders (14) intervene at the same time to drive their respective disks (14a) against the collar of the hanger, thereby immobilizing the body of the hanger and the clothing item on the same.

In this regard it should be noted that the two disks (14a) are driven against each other, at different pressures, so that the disk which is driven by the greater pressure, takes the hangers in the same correct position under the clip (11), while the other disk, driven by the lower pressure, can adapt to the different thicknesses of the hangers grasped; this feature was introduced in the machine according to the invention in order to avoid that a hanger held firmly between the above disks (14a) be positioned incorrectly and/or that a possible excessively firm hold of the hanger might damage the clothing item on the same.

Once the hanger has been blocked in this way, the pneumatic device (7) starts operating and rotates the shaft (8)—clip-holder bar (9) unit so that the hook tips over clip-holder bar (9) unit so that the hook tips over 180° with respect to the underlying hanger which has been grasped and held by the pair of disks (14a).

Once the clip and consequently also the hanger hook have completed this rotation, the disks (14a) are opened to release the hanger; the clip-holder bar (9) in this way reaches the unloading point, after the arms (13) have been stopped and tipped backwards by the cam (17) of the conveyor line on which the item is to be unloaded, and which intervenes on the rod (17) fitted on one of these arms (13).

The hanger is then unloaded automatically at the end of the trolley (2) run, when the clip (11) is opened by the intervention of the above rod (18) against the projecting part (11c) of the opening section (11b) of the same; in fact by opening the clip, the hanger falls spontaneously and hooks on the special supports fitted on the second conveyor line.

Once the unloading operation has been completed, the trolley (2) according to requirements, may either remain in the end of run position—ready to lift a hanger from the line on which it has unloaded the hanger to transfer it to the opposite line—or it can return to the center of the machine in rest position while waiting for new commands, or it may return directly towards the other conveyor line for a new load.

It should be reiterated at this point that the entire sequence which has been described may be carried out either by loading a clothing item from one line and unloading it on the other or vice versa.

Regarding the operation of the above opening device, it must be said that when the same is at rest, the paddles (19) are held against each other in a lifted position slightly back corresponding to a stop at the top end of run of the sliding block (22) and a stop at the rear end of run of the bracket (27) which moves and connects the collars (20a) of the rocking levers (20).

When this device starts operating, the bracket (27) moves forward horizontally, driven by the respective cylinder (26), and slides the pair of paddles (19) between the two adjacent hangers which are to be opened, at the height of their hooks.

The cylinder (26) now makes the sliding block (22) and consequently also the paddles (19) to descend, so that the same reach the height of the hanger collar; once this descent has been completed, the paddles (19) start opening as a result of the operation of the cylinder (28) which opens two adjacent clothing items fully and sufficiently to easily insert the incoming clothing item between them.

Once the item has been deposited, the cylinder (26) makes the bracket (27) return, and with it also the paddles (19) which are still open, and which, gradually lose their contact with the clothing items which they had previously spaced open; as soon as the bracket (27) has terminated its return run, the cylinder (23) makes the sliding block (22) return, after which the pneumatic cylinder (28) once again grasps the paddles between them (19).

In the case of skirt hangers, it was found that once the item transferred has been inserted, if the paddles (19) are retracted to full opening—this may create some interference between the paddles and the clips on the ladies' skirt hangers.

To resolve this problem, the paddles (19) have been designed to retract by following a different sequence; in other words, firstly these paddles (19) move close together without closing completely—making full use of the action of the pneumatic cylinder (29)—and then they lift again to a semi-closed position, to then move back while maintaining the open position, and finally to close and wait for a new operating phase.

It should be noted that all the operating phases are directed and controlled by an electronic command and control panel which is fitted with a series of closeness detectors which can read and indicate the subsequent positions of the different mobile parts of the machine. As mentioned previously, the machine according to the invention may be enabled, with a few easy modifications, for transferring single-block hangers which can not rotate independently with respect to their hook.

Figure 7:
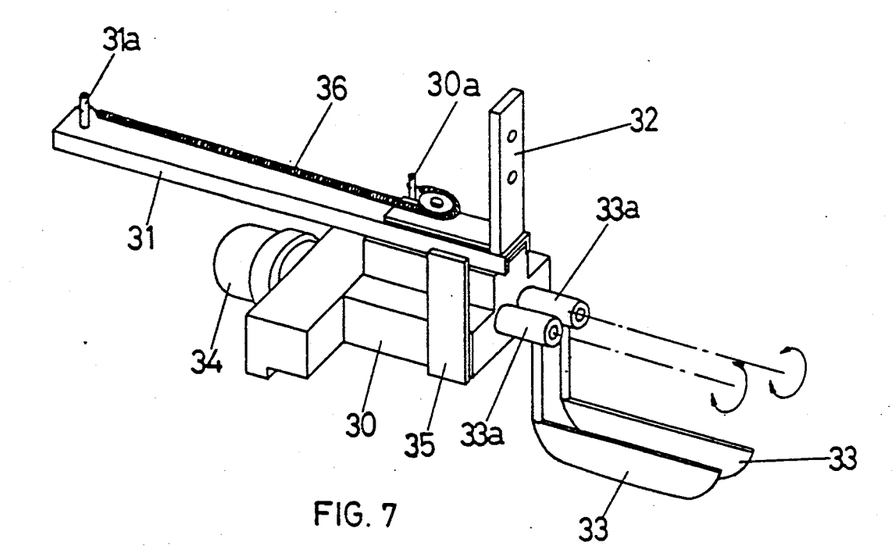
FIG. 7 is a schematic axonometric illustration of the accessory device which can be fitted to the machine in question for rotating the whole hanger together with the hook.
Figure 8:
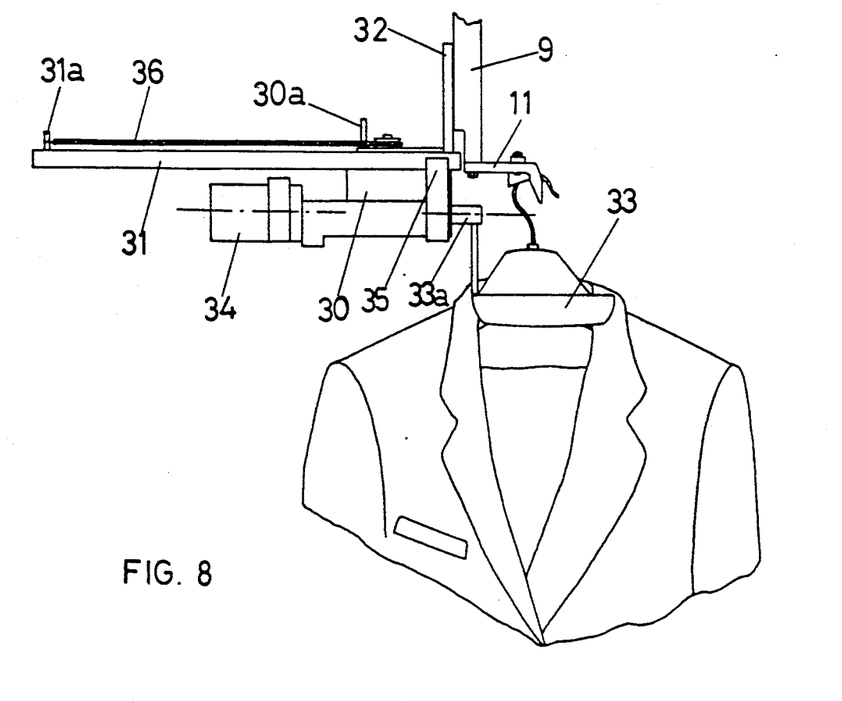
FIG. 8 is a side view of the device illustrated in FIG. 7 installed on the machine according to the invention.

With reference to FIGS. 7 and 8 a description is given of the accessory device which can be installed on the machine in question—after having previously dismounted the above pair of oscillating arms (13)—and which can rotate the entire hanger during its transfer from one overhead conveyor line to another.

This device consists of a trolley (30) which slides horizontally within a box shaped support and runner track (31) which may be fixed, by means of a supporting plate (32), to the above clip-holder bar (9) on the opposite side with respect to that on which the clip (11) projects. At the front of this trolley (30) there are two identical horizontal paddles (33)—for grasping the collar of the hanger during rotation—which are oscillated around respective horizontal pivoting pins (33a) to the trolley (30), by a pneumatic device (34) which opens or snaps closed as necessary.

In particular, the maximum utility of these paddles (33) involves the fact that once they have firmly secured the collar of a hanger, they can prevent further excessive oscillations during rotation.

On the side of the trolley (30) there is a vertical rod (35) which interferes with a special fixed striker fitted on the conveyor line, in order to stop the progression of the trolley (30) when the clip (11) is at the end of the run to unload or lift a hanger; this feature is required to prevent the paddles (33)—which project from the front the trolley and well over the clip (11) between the same—from interfering during these operating phases.

The trolley (30) stops in fact when it slides backward with respect to the overlying track (31), thereby loading a return spring (36) which in this phase is stretched in that it is hooked at one end to the trolley (30) close to the vertical pin (30a) and at the other end to a fixed vertical pin (31a) projecting from the top face of the track (31).

It is obvious that the above spring (36) can bring forward the trolley (30) to reach its rest position, as soon as there is not further contact between its rod (35) and the relevant fixed striker, during the run of the clip (11) away from the lifting line or unloading line.

Figures 9, 10, 11:
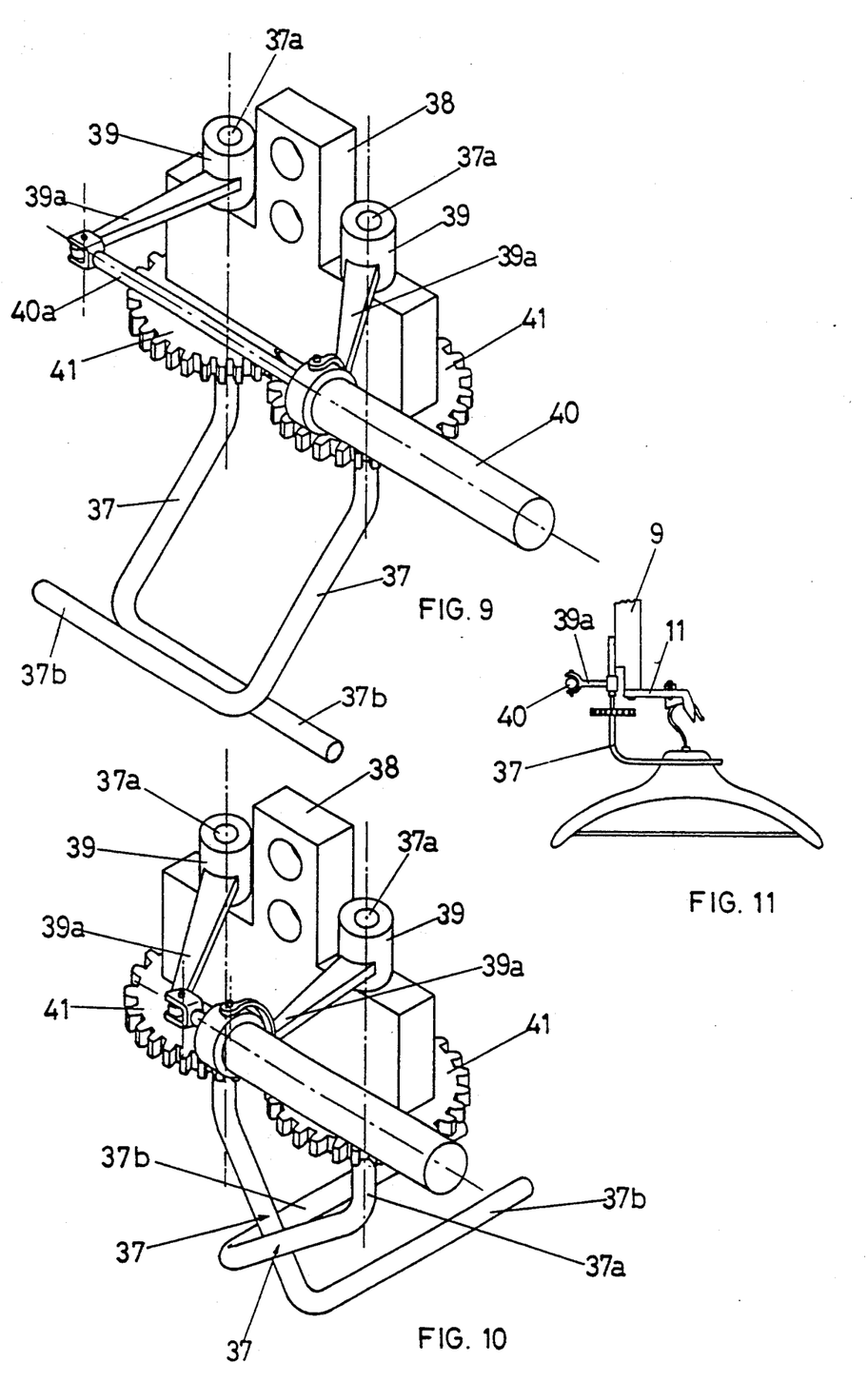
FIG. 9 is an axonometric illustration of an additional version of the accessory device for rotating the whole hanger together with the hook, illustrated at rest.
FIG. 10 shows the same accessory illustrated in FIG. 9 in operating position, namely when its arms are positioned side by side at the front of the device ready to grasp the opposite ends of the hanger neck.
FIG. 11 is a schematic side view of the application of the device illustrated in FIG. 9 to the clip-holder bar (9) of the machine according to the invention.

With reference to FIGS. 9, 10 and 11, a description is given of another version of the accessory device which rotates a hanger together with its hook.

This version is different from the previous mainly because its oscillating arms (37) rotate around vertical axes, instead of tipping around horizontal pins. In particular it should be noted that each of these shaped arms has a horizontal bottom section (37b), connected by a slanted section, with a top section having a vertical axis (37a).

The device according to the invention consists of a supporting plate (38)—to be fixed to the clip-holder bar (9) as indicated in FIG. 11—on which the above shaped arms (37) are pivoted symmetrically; in particular the end section having a vertical section (37a) of each of these (37) crosses the above plate (38) and then comes out at the top, in a position in which it is stopped in a special collar (39) on the side of which a shelf (39a) projects horizontally.

At the ends of the two identical shelves (39a) the liner of a pneumatic cylinder (40) and the end of the relevant shaft (40a) are pivoted respectively, around a vertical axis; this pneumatic cylinder (40) opens and closes the arms (37).

In particular, when the cylinder (40) operates, it rotates the vertical end sections (37a) of the arms (37) in the opposite direction; on these arms—under the support plate (38)—there are two geared and engaging wheels (41) which rotate the arms (37) in the opposite direction at the same time.

With particular reference to FIG. 9, it can be noted that when the shaft (40a) of the pneumatic cylinder (40) has been expelled completely, the shelves (39a) are open while the arms (37) are positioned on the back of the clip-holder bar (9) and away from the clip (11).

FIG. 10 illustrates how after the shaft (40a) of the pneumatic cylinder (40) has been withdrawn, the shelves (39a) move closer while the vertical sections (37a) of the arms (37) rotate in the opposite direction so as to move the bottom horizontal sections of the same (37) next to the clip (11) when a hanger (as indicated in FIG. 11) has been hooked on the same.

I claim:

1. An automatic machine for lifting, transferring and unloading clothes hangers between two adjacent overhead conveyor lines consisting of:

a trolley (2) driven in alternating horizontal runs along a supporting frame (1) by a pneumatic cylinder (3) having a horizontal axis; a shelf (4) is fitted to this trolley (2); a block (5) projects vertically from the shelf (4), the latter having a vertical groove (5a) in which a tooth fits and slides, the same being constructed at the back of a small platform (6) driven in alternating vertical runs by a pneumatic cylinder (10) having a vertical axis, and which is in turn fixed at the bottom to the plate (4);

a vertical shaft (8) driven in alternating 180° rotations by a pneumatic device (7) supported by the above platform (6); the shaft (8) crosses the above trolley (2) and comes out at the bottom so as to support a vertical clip-holder bar (9) which therefore rotates together with the same (8); a precompressed return helicoidal cylindrical spring is fitted externally on the shaft (8);

a clip (11) consisting of two sections, one of which is fixed (11a) and the other which can be opened (11b), pivoted to the first (11a) and constantly subject to the action of a return spring which tightens the clip (11); there is a horizontal projecting part (11c) on the oscillating section (11b);

a pair of opposing and symmetrical vertical arms (13) keyed at the ends of a shaft having a horizontal axis (12) and fitted idle in a prismatic section (2a) fitted under the trolley (2); at the ends of the arms (13) there are two coaxial and opposing pneumatic cylinders (14) which produce the alternating and opposing runs of two disks (14a) which terminate with different pressure values from opposite sides against the neck of the hanger held between the same by the clip (11); a shock absorber (15) is held by a special bracket (15a), which acts on one of the arms (13) so as to maintain the pair of these arms (13) at rest, in an inclined position so that the sliding axis of the opposing disks (14a) is on the same vertical plane as the supporting point of the hanger hook inside the clip (11); finally a horizontal shaft (16) is fixed on the outside of the other arm (13); two idle running wheels (16a) which operate with the cams (17) fitted on the conveyor line frame are pivoted at the ends of the horizontal shaft (16), so as to stop and turn the pair of arms (13) over when the trolley (2) reaches the end of the run;

a pair of rods (18) having a vertical axis, each fitted close to the loading and unloading station of each conveyor line—the rods retract into their vertical housings, but are subject to the outward thrust of respective springs; the rods (18) are positioned so as to interfere with the projecting part (11c) of the clip (11) when the latter reaches the end of the run, so as to open the same.

2. An automatic machine for lifting, transferring and unloading clothes hangers between two adjacent overhead conveyor lines characterized in that the same features an opening device consisting of a horizontal pair of shaped paddles (19) fixed to the feet of two rocking levers (20) which, because of the collars (20a) with which they are fitted at the top, can slide freely along a pair of horizontal runner and supporting bars (21) operated by a pneumatic cylinder (26)—fixed externally on a plate (25) screwed at the two ends of the above bars (21)—whose shaft crosses the plate (25) and hooks on the plate (27) to connect the collars together (20a); the paddles (19) are opened by means of two pneumatic cylinders (28) and (29) having a horizontal axis—the same being mounted in a coaxial and opposing position on two rocking levers (20)—having connected shafts and which carry out specific functions: the first (28) opens and closes the paddles (19) fully, while the second (29) partially closes the paddles (19) previously opened in full by the first cylinder (28); the horizontal bars (22) are fixed so as to overhang a sliding block (22) which performs—thanks to its respective pneumatic cylinder having a vertical axis (22a)—alternating runs along two other vertical runner bars (23), supported by a support plate (24) fixed to the frame of the machine; two engaging geared semi-circular sections are mounted on the front of the rocking levers (20) which guarantee a correct and uniform rotation in the opposite direction of the paddles (19).

3. An automatic machine for lifting, transferring and unloading clothes hangers between two adjacent overhead conveyor lines, according to claim 1, characterized in that by dismounting the pair of arms (13), an accessory device can be fitted for rotating the hanger and its respective hook together; this device consists of a trolley (30) which slides horizontally in a box-shaped supporting and guiding track (31) which can be fixed, by means of a supporting plate (32), to the above clip-holder bar (9) on the opposite side of that on which the clip (11) projects; at the front of this trolley (30) there are two identical horizontal paddles (33)—for grasping the collar of the hanger during rotation—oscillated around the respective horizontal pivot pins (33a) to the trolley (30) by a pneumatic device (34) which opens or snaps close as required; at the side of the trolley (30) there is a vertical projecting part (35) for striking against a special fixed striker fitted on the conveyor line in order to stop the trolley (30) when the clip (11) is at the end of the run to unload or lift a hanger; finally,—above the track (31)—a return spring (36) is hooked, at one end to a vertical pin (30a) which is fitted on the trolley (30) and at the other end, to a fixed vertical pin (31a) projecting from the top face of the track (31).

4. An automatic machine for lifting, transferring and unloading clothes hangers between two adjacent overhead conveyor lines, according to claim 1, characterized in that another version of the accessory device for rotating the hanger together with its hook can be installed; this device consists of a supporting plate (38)—which is fixed on the clip-holder bar (9)—on which two identical shaped arms (37) are pivoted symmetrically, each of which has a horizontal section (37b) at the bottom coupled by a slanted section to an end top section having a vertical axis (37a) which crosses the above plate (38) to come out at the top, where it is stopped in a collar (39) on the side of which a shelf (39a) projects horizontally; at the ends of the two identical shelves (39a), the lining of a pneumatic cylinder (40) and the end of the relevant shaft (40a) are pivoted around a vertical axis at the ends of two identical shelves (39a); the runs of the same produce a simultaneous and identical oscillation in the opposite direction of the vertical sections (37a) of the arms (37) on which—under the plate (38)—two engaging and geared wheels (41) are fitted and fixed.

5. An automatic machine for lifting, transferring and unloading clothes hangers between two adjacent overhead conveyor line according to claim 1, characterized in that the sections of the clip (11) terminate at the front with two prismatic sections turned downwards and chamfered internally, so as to form an upside down "V" whose tip is positioned at the entrance of a vertical opening (11d)—on the fixed section (11a) and delimited by two parallel walls and by a curved back wall—for perfectly housing the hanger hook; inside this opening (11d) the hook of the hanger is blocked when the clip (11) closes, thanks to the intervention of a slanted step (11e) which projects from the side of the prismatic section of the mobile section (11b) and which closes the opening (11d) from the bottom so as to prevent the hanger hook from escaping until the next opening of the clip (11).

* * * * *